United States Patent
Yoshida (10) Patent No.: US 10,051,149 B1
(45) Date of Patent: Aug. 14, 2018

(54) MANAGING PRINTER ERRORS

(71) Applicant: Konica Minolta Laboratory U.S.A., Inc., San Mateo, CA (US)

(72) Inventor: Hidetaka Yoshida, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/476,724

(22) Filed: Mar. 31, 2017

(51) Int. Cl.
*H04N 1/00* (2006.01)
*G06K 15/02* (2006.01)
*H04N 1/32* (2006.01)

(52) U.S. Cl.
CPC ......... *H04N 1/32641* (2013.01); *G06K 15/02* (2013.01); *H04N 1/0057* (2013.01); *H04N 1/00244* (2013.01); *H04N 1/00676* (2013.01); *H04N 2201/0082* (2013.01)

(58) Field of Classification Search
CPC .......... H04N 1/32641; H04N 1/00244; H04N 1/0057; H04N 1/00676; H04N 2201/0082; G06K 15/02
USPC ....................................................... 358/1.14
See application file for complete search history.

(56) References Cited

U.S. PATENT DOCUMENTS

| | | | | |
|---|---|---|---|---|
| 2002/0012135 A1* | 1/2002 | Nagaso | ............. | H04N 1/00912 358/400 |
| 2007/0014614 A1* | 1/2007 | Yoshida | ............. | G03G 15/5016 400/62 |
| 2009/0257760 A1* | 10/2009 | Kaneda | ............. | G03G 15/5012 399/18 |
| 2013/0187325 A1* | 7/2013 | Ohmiya | ................. | B65H 5/00 271/3.14 |
| 2014/0092410 A1* | 4/2014 | Taima | .................. | G06F 3/1234 358/1.13 |
| 2016/0274852 A1* | 9/2016 | Katabami | ............. | G06F 3/1286 |

FOREIGN PATENT DOCUMENTS

JP  2009-202437 A  9/2009

* cited by examiner

*Primary Examiner* — Allen H Nguyen
(74) *Attorney, Agent, or Firm* — Osha Liang LLP (57) ABSTRACT

A method for printing, including: receiving, by a printer, a main print job; generating, by the printer and based on the main print job, a first hardcopy page, a second hardcopy page, and a third hardcopy page; detecting, by the printer, a printed error on the first hardcopy page; sending, by the printer, the first hardcopy page to a first output location in response to detecting the printed error; detecting, by the printer, no printed errors on the second hardcopy page; and sending, by the printer, the second hardcopy page to a second output location in response to detecting no printed errors.

21 Claims, 6 Drawing Sheets

MANAGING PRINTER ERRORS

BACKGROUND

A print job ticket includes content (e.g., text, clipart, photos, etc.) to be printed and instructions for printing and/or processing the content. These instructions may correspond, for example, to the number of copies, N-up printing, duplex printing (i.e., two-sided printing), cutting instructions, packaging instructions, etc.

As printers are mechanical devices, it is possible for printed errors (e.g. smudges, smears, fading, ink bleeding, etc.) to be present on a printed (i.e., hardcopy) page. When multiple hardcopy pages have been printed, an operator must examine each of the hardcopy pages for printed errors. This is time consuming. Regardless, users still wish to generate hardcopy documents.

SUMMARY

In general, in one aspect, the invention relates to a method for printing. The method comprises: receiving, by a printer, a main print job; generating, by the printer and based on the main print job, a first hardcopy page, a second hardcopy page, and a third hardcopy page; detecting, by the printer, a printed error on the first hardcopy page; sending, by the printer, the first hardcopy page to a first output location in response to detecting the printed error; detecting, by the printer, no printed errors on the second hardcopy page; and sending, by the printer, the second hardcopy page to a second output location in response to detecting no printed errors.

In general, in one aspect, the invention relates to a printer. The printer comprises: a first output location; a second output location; and a computer processor that: receives a main print job; generates, based on the main print job, a first hardcopy page, a second hardcopy page, and a third hardcopy page; detects a printed error on the first hardcopy page; sends the first hardcopy page to the first output location in response to detecting the printed error; detects no printed errors on the second hardcopy page; and sends the second hardcopy page to the second output location in response to detecting no printed errors.

In general, in one aspect, the invention relates to a non-transitory computer readable medium (CRM) storing computer program code. When executed by a computer processor, the computer program code: receives a main print job; generates, based on the main print job, a first hardcopy page, a second hardcopy page, and a third hardcopy page; detects a printed error on the first hardcopy page; sends the first hardcopy page to the first output location in response to detecting the printed error; detects no printed errors on the second hardcopy page; and sends the second hardcopy page to the second output location in response to detecting no printed errors.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a printer, a method for printing, and a non-transitory computer readable medium (CRM) storing instructions for printing. Specifically, a printer receives a main print job and generates hardcopy pages based on the main print job. The printer also scans each hardcopy page for printed errors. Hardcopy pages having no printed errors are sent to one output location (e.g., slot, tray, bin, etc.), while hardcopy pages having printed errors are sent to a different output location (e.g., slot, tray, bin, etc.). Additionally or alternatively, hardcopy pages having printed errors in different locations may be sent to different output locations. In one or more embodiments, a hardcopy page with a printed error may be flipped to align the printed error with the printed error of a different hardcopy page, and both hardcopy pages are sent to the same output location (e.g., slot, tray, bin, etc.).

In general, in one or more embodiments, the printer also generates multiple auxiliary print jobs based on the main print job. For example, there may be one auxiliary print job for each output location (e.g., slot, tray, bin, etc.). An auxiliary print job may include cutting and/or packaging instructions for the hardcopy pages sent to one of the output locations. The auxiliary print jobs are sent to one or more cutters and used to process the hardcopy pages.

Figure 1:
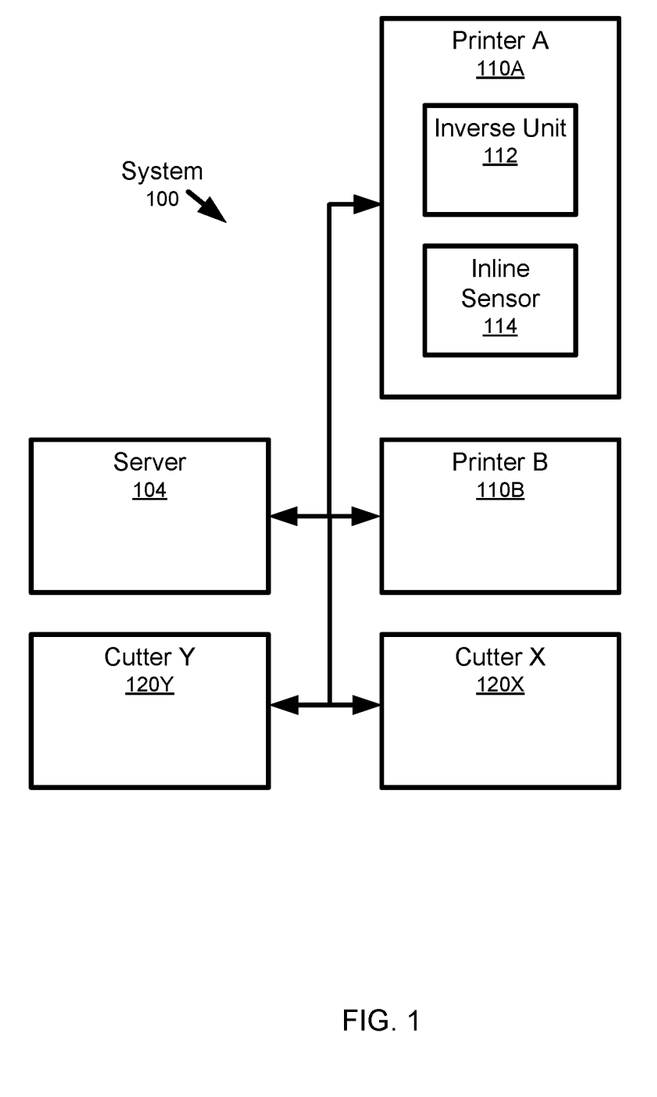
FIG. 1 shows a system in accordance with one or more embodiments of the invention.

FIG. 1 shows a system (100) in accordance with one or more embodiments of the invention. As shown in FIG. 1, the system (100) has multiple components including a server (104), one or more printers (e.g., Printer A (110A), Printer B (110B)), and one or more cutters (e.g., Cutter X (120X), Cutter Y (120Y)). The components (104, 110A, 110B, 120X, 120Y) may be connected by one or more networks of any size having wired and/or wireless segments.

In one or more embodiments of the invention, the system (100) includes the server (104). The server (104) may be connected to multiple client devices (not shown). The server (104) is configured to issue a main print job. For example, the main print job may be issued by the server (104) at the request of a client (not shown). The main print job specifies content (e.g. text, clipart, photos, etc.) to be printed. The main print job also specifies instructions for printing the content. For example, the main print job may specify black and white or color printing, stapling, hole-punching, etc. As another example, the main print job may specify two-sided printing (i.e., duplex printing). As another example, the main print job may specify 2-up, 4-up, 6-up, etc. printing. In one or more embodiment, the main print job may specify cutting instructions. For example, in the case of N-up printing, the main print job may specify that the hardcopy page be cut into N pieces and the locations of the cut lines.

In one or more embodiments of the invention, the system (100) includes one or more printers (110A, 110B). Each printer (110A, 110B) is configured to receive a main print job and generate hardcopy pages based on the main print job. As shown in FIG. 1, printer A (110A) includes an inline sensor (114). The inline sensor (114) is an image sensor embedded in a paper path of the printer that looks for (i.e., detects) printed errors in the hardcopy pages on a page-by-page basis. Examples of printed errors include smudges, smears, fading, ink bleeds, etc. Printer A (110A) also includes an inverse unit (112). The inverse unit (112) is configured to flip hardcopy pages (e.g., along the horizontal axis, along the vertical axis, along both the horizontal and vertical axes, etc.) (discussed below). In one or more embodiments, printer B (110B) has the same or substantially the same functionality/components of printer A (110A).

In one or more embodiments of the invention, each printer (110A, 110B) includes multiple output locations (e.g., slot, tray, bin, etc.). Printer A (110A) may send all hardcopy pages having no printed errors to one output location. Printer A (110A) may send all hardcopy pages having at least one printed errors to a different output location. Additionally or alternatively, printer A (110) may send hardcopy pages having printed errors to different output locations depending on the location of the printed error.

For example, in the case of duplex printing, printer A (110) may send all hardcopy pages having no printed errors to tray 1, all hardcopy pages having a printed error on the front side to tray 2, all hardcopy pages having a printed error on the back side to tray 3, and all hardcopy pages having printed errors on both sides to tray 4. Additionally or alternatively, a hardcopy page having a printed error on its back side may be flipped (i.e., printed error is now on the front side) and then sent to tray 2 (i.e., tray 3 is not needed). Additionally or alternatively, a hardcopy page having a printed error on its front side may be flipped (i.e., printed error is now on the back side) and then sent to tray 3 (i.e., tray 2 is not needed).

As another example, in the case of N-up printing, there are N possible locations on the hardcopy page where a printed error may exist. Printer A (110) may send all hardcopy pages having a printed error at location 1 to tray 1, all hardcopy pages having a printed error at location 2 to tray 2, . . . , all hardcopy pages having a printed error at location N to tray N, and all hardcopy pages having no printed errors to tray N+1. Additionally or alternatively, printer A (110) may flip some hardcopy pages (e.g., set M of hardcopy pages) to align the printed errors on the hardcopy pages with the printed errors on other hardcopy pages (e.g., set N of hardcopy pages). The hardcopy pages of set M and set N may be sent to the same tray. This reduces the number of trays required.

In one or more embodiments of the invention, printer A (110) generates auxiliary print jobs based on the main print job. Specifically, printer A (110) may generate an auxiliary print job for each output location. The auxiliary print job associated with an output location may specify the number of pages that were sent to the output location. In one or more embodiments of the invention, all hardcopy pages, either in their original orientation or after flipping, that are sent to the output location have printed errors in the same location. Accordingly, the auxiliary print job may also specify the location of the printer errors on the hardcopy pages that were sent to the output location. The auxiliary print job may also specify cutting instructions and/or packaging instructions that were present in the main print job. The auxiliary print jobs are sent to one or more cutters (120X, 120Y). The auxiliary print jobs may be sent directly to the cutters or via the server (104) (i.e., the server (104) relays the auxiliary print job(s) from the printer(s) (110A, 110B) to one or more cutters (120X, 120Y)). In one or more embodiment of the invention, the server (104) generates the auxiliary print jobs based on page counts and printed error locations provided by printer A (110). In one or more embodiments, an auxiliary print job does not specify the content that was printed (i.e., only the main print job specifies content to be printed).

Those skilled in the art, having the benefit of this detailed description, will appreciate that when one printer output location (e.g., tray R) holds hardcopy pages with no printed errors, and another printer output location (e.g., tray S) holds hardcopy pages with printed errors, the printer operator only needs to sort through the hardcopy pages in tray S.

In one or more embodiments of the invention, the system (100) includes one or more cutters (i.e., Cutter X (120X), Cutter Y (120Y)). Each cutter (120X, 120Y) may be a guillotine cutter or a page-by-page cutter. Each cutter (120X, 120Y) may input an auxiliary print job. Moreover, an operator may transport hardcopy pages from a printer output location (e.g., tray, slot, bin, etc.) to the cutter (120X, 120Y). Each cutter (120X, 120Y) may be configured to cut hardcopy pages according to an auxiliary print job. Moreover, each cutter (120X, 120Y) may be configured to discard cut portions of the hardcopy pages that have printed errors and/or package cut portions of the hardcopy pages that do not have printed errors.

Those skilled in the art, having the benefit of this detailed description, will appreciate that when hardcopy pages are sorted by printed error location, the hardcopy pages do not need to be cut on a page-by-page basis. In other words, since the hardcopy pages all have printed errors in the same location (or have been flipped to have printed errors in the same location), the hardcopy pages can be cut as a group using a guillotine cutter. This also reduces sorting time by a printer operator.

Figure 2:
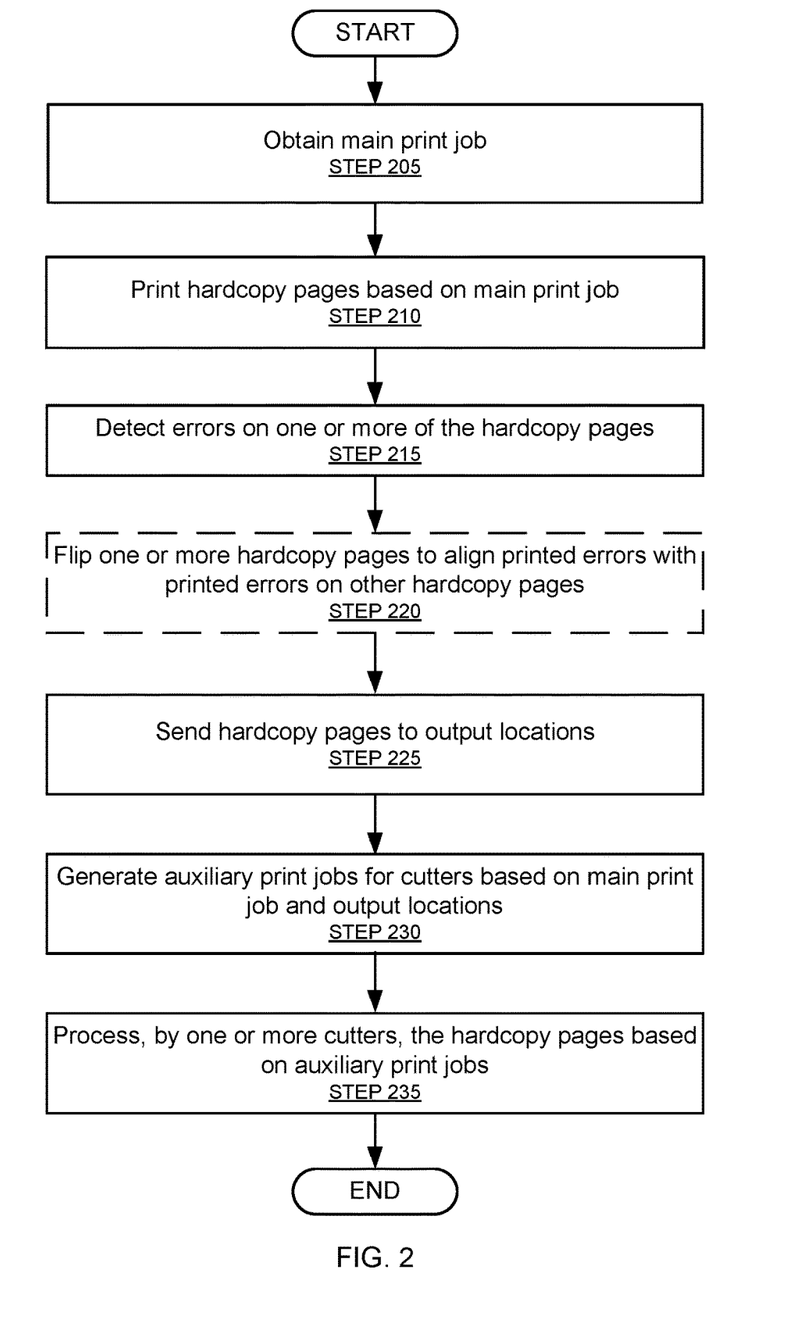
FIG. 2 shows a flowchart in accordance with one or more embodiments of the invention.

FIG. 2 shows a flowchart in accordance with one or more embodiments of the invention. The flowchart depicts a process for printing. One or more of the steps in FIG. 2 may be performed by the components of the system (100) (e.g., printer A (110A)), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a main print job is obtained (STEP 205). The main print job may be issued by a server and received by a printer. The main print job may be downloaded from a website and/or retrieved from a repository. The main print job specifies content (e.g., text, clipart, photos, etc.) to be printed. The main print job also includes instructions for printing the content. For example, the main print job may specify duplex printing or N-up printing. The main print job may correspond to an electronic document (e.g., word processing document, spreadsheet, slide show, webpage, etc.). The main print job may also specify color printing, paper type (e.g., size, weight, etc.).

In STEP 210, hardcopy pages are printed based on the main print job. If the main print job specifies duplex printing, content is printed on both sides (i.e., front side, back side) of one or more hardcopy pages. If the main print job specifies N-up printing, each hardcopy page may be partition into N regions. The same content may be printed in each of the N regions. For example, the same business card may be duplicated N times on single hardcopy page. Additionally or alternatively, N different pages from the electronic document may be printed in the N regions.

In STEP 215, printed errors are detected on one or more of the hardcopy pages. The printed errors may correspond to smudges, smears, fading, ink bleeds, etc. The printed errors may be detected by scanning the hardcopy pages. For example, the printed errors may be detected by an inline sensor of the printer. In the case of duplex printing, the printed error(s) may appear on the front side, the back side, or both sides of the hardcopy page. In the case of N-up printing, the printed error may occur in any of the N regions on the hardcopy page.

In STEP 220, one or more of the hardcopy pages may be flipped (e.g., along the horizontal axis and/or along the vertical axis). By flipping a hardcopy page, the printed error on the hardcopy page may align with the printed errors on other hardcopy pages. For example, assume there exists a set of hardcopy pages each with a printed error on the top left corner. Further, assume there exists hardcopy page Q with a printed error on the bottom right corner of the page. By flipping hardcopy page Q along the horizontal axis and vertical axis, the printed error on hardcopy page Q now aligns with the printed error on the set of hardcopy pages.

As another example, assume there exists a set of hardcopy pages with printed errors on the front side of the hardcopy pages. Further, assume there exists hardcopy page W with a printed error on its back side. By flipping hardcopy page W, the printed error is now on the front side and this aligns with the printed errors on the set of hardcopy pages. In one or more embodiments, STEP 220 is optional and depends on the number of output locations provided by the printer.

In STEP 225, the hardcopy pages are sent to output locations (e.g., trays, slots, bins, etc.). The hardcopy pages with no printed errors are sent to one output location, while the hardcopy pages with printed errors are sent to a different output location. Alternatively or additionally, all hardcopy pages having printed errors at a first location, either as originally printed or after flipping, are sent to a first output location, while all hardcopy pages having printed errors at second location, either as originally printed or after flipping, are sent to a second location, etc. For example, all hardcopy pages having printed errors on the front side, or hardcopy pages with printed errors on the backside that have been flipped, may be sent to the same tray. Similarly, all hardcopy pages having printed errors on the top left corner, or hardcopy pages with printed errors on the bottom right corner that have been flipped, may be sent to the same tray.

In STEP 230, one or more auxiliary print jobs are generated based on the main print job. Moreover, one auxiliary print job may be generated for each output location. For example, if all hardcopy pages having no printed errors are sent to tray 1, and all hardcopy pages having at least one printed error are sent to tray 2, an auxiliary print job is generated for tray 1 and an auxiliary print job is generated or tray 2. The auxiliary print job associated with an output location may specify the number of hardcopy pages that were sent to the output location. In one or more embodiments of the invention, all hardcopy pages, either in their original orientation or after flipping, that are sent to the output location have printed errors in the same location. Accordingly, the auxiliary print job may also specify the location of the printer errors on the hardcopy pages that were sent to the output location. The auxiliary print job may also specify cutting instructions and/or packaging instructions that were present in the main print job. In one or more embodiments, an auxiliary print job does not specify the content that was printed (i.e., only the main print job specifies content to be printed). The auxiliary print jobs may be transmitted to one or more cutters. The auxiliary print jobs may be generated by the printer and sent directly to the cutter(s) (i.e., bypassing the server). Additionally or alternatively, the auxiliary print jobs may be generated by server (based on information provided by the printer) and sent to the cutter(s).

In STEP 235, the hardcopy pages are processed by one or more cutters. The one or more auxiliary print jobs may be transmitted to one or more cutters (e.g., guillotine cutters, page-by-page cutters, etc.). Moreover, a printer operator may transport the hardcopy pages from an output location (e.g., tray, slot, bin, etc.) to one of the cutters. Each cutter may be configured to cut hardcopy pages from an output location according to an auxiliary print job. Moreover, each cutter may be configured to discard cut portions of the hardcopy pages that have printed errors and/or package cut portions of the hardcopy pages that do not have printed errors. In one or more embodiments of the invention, a set of hardcopy pages having no printed errors is processed using a guillotine cutter, while a set of hardcopy pages having printed errors anywhere is processed using a page-by-page cutter.

Those skilled in the art, having the benefit of this detailed description, will appreciate that the process depicted in FIG. 2 saves time because there is less need for the printer operator to sort through all the hardcopy pages looking for printed errors (i.e., hardcopy pages with printed errors are sent to different output locations than the hardcopy pages with no printed errors), and because there is less need for the printer operator to perform cutting on a page-by-page basis (i.e., all hardcopy pages with printed errors at the same location may be sent to the same output location and cut, as a group, using a guillotine cutter).

In one or more embodiments, the process described in FIG. 2 also provides one or more advantages when using a page-by-page cutter. As discussed above, hardcopy pages with printed errors in different locations may be sent to different trays, slots, bins, etc. Accordingly, when a printer operator moves a set of hardcopy pages from a tray to a page-by-page cutter, the printer operator already knows the location of the printed errors on each of the hardcopy pages in the set and can quickly cut and process the set on the page-by-page cutter without the need to look for the printed errors on each hardcopy page.

Figure 3A:
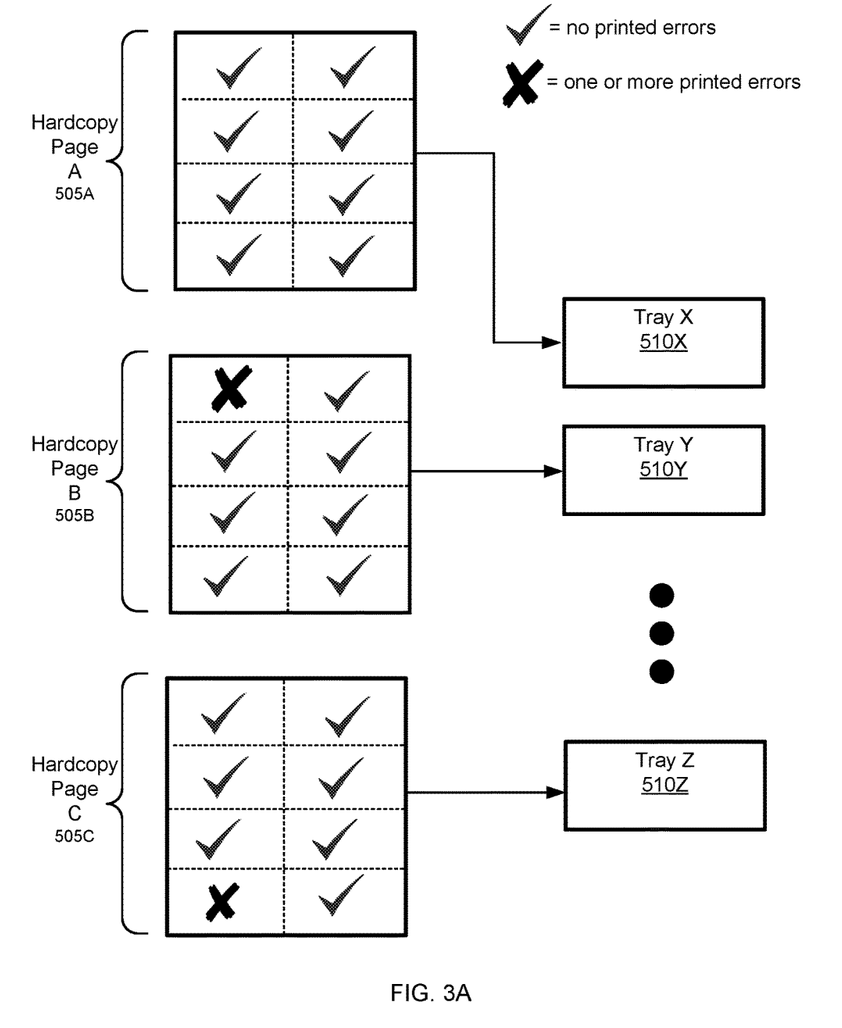
FIG. 3A, FIG. 3B, and FIG. 3C show examples in accordance with one or more embodiments of the invention.
Figure 3B:
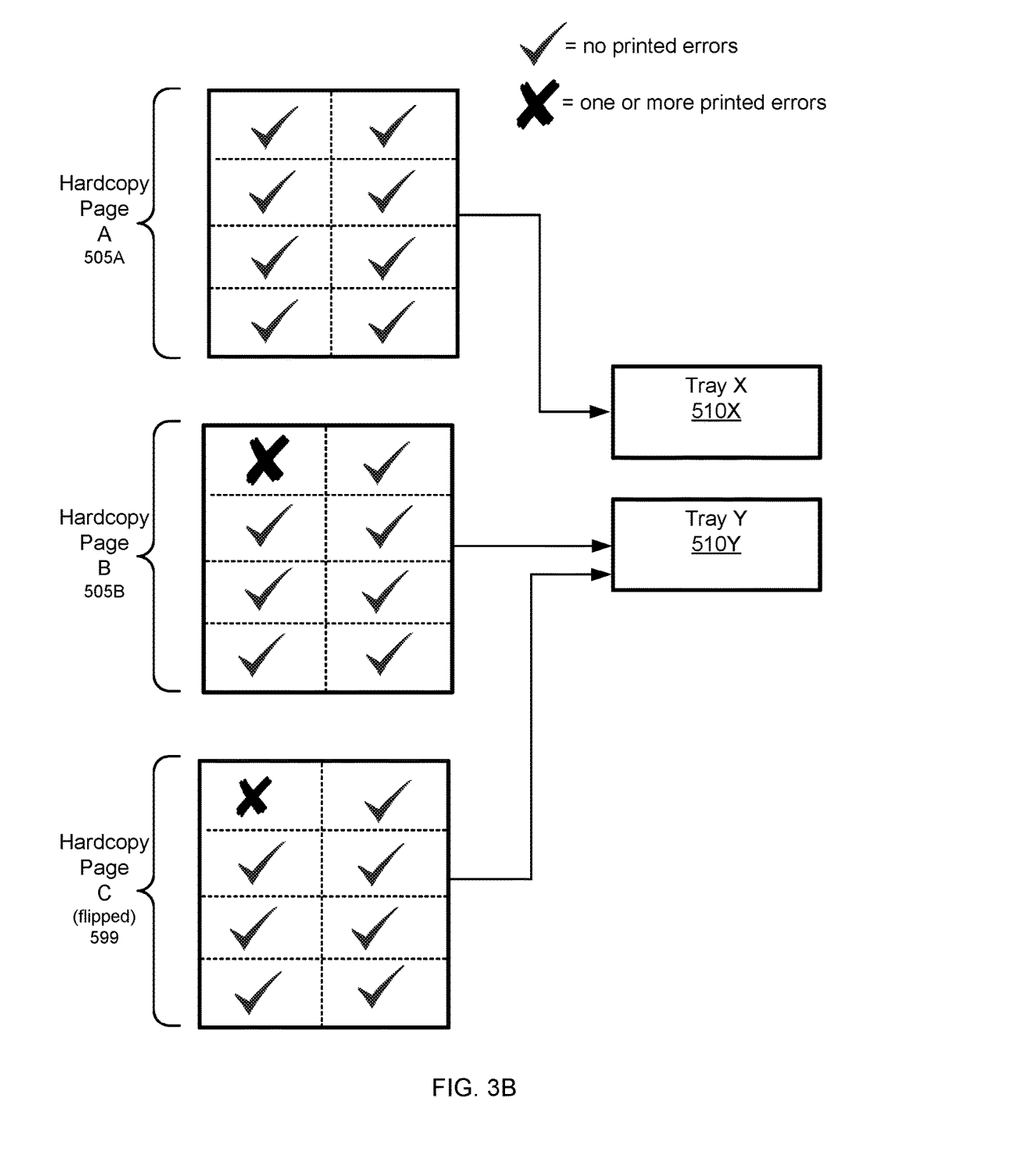

FIG. 3A and FIG. 3B show examples in accordance with one or more embodiments of the invention. In FIG. 3A, assume there exists a main print job that specifies 8-up printing. The main print job also requires each hardcopy page be cut into 8 pieces. Moreover, assume three hardcopy pages are printed based on the main print job: hardcopy page A (505A), hardcopy page B (505B), and hardcopy page C (505C). As shown in FIG. 3A, hardcopy page A (505A) has no printed errors. However, hardcopy page B (505B) has a printed error on its top left corner, while hardcopy C (505C) has a printed error on its bottom left corner.

Hardcopy page A (505A) and all hardcopy pages with no printed errors are sent to Tray X (510X) of the printer. Moreover, an auxiliary print job may be generated for the hardcopy pages in Tray X (510X). The auxiliary print job may specify the number of hardcopy pages in Tray X (510X). The auxiliary print job may also specify the cut lines and that all cut pieces should be packaged (i.e., no cut piece should be discarded). The auxiliary print job is transmitted to a guillotine cutter and the printer operator transports the hardcopy pages in Tray X (510X) to the guillotine cutter where they are cut and packaged according to the auxiliary print job.

Hardcopy page B (505B) and all hardcopy pages with a printed error on the top left corner are sent to Tray Y (510Y) of the printer. Moreover, an auxiliary print job may be generated for the hardcopy pages in Tray Y (510Y). The auxiliary print job may specify the number of hardcopy pages sent to Tray Y (510Y). The auxiliary print job may also specify the cut lines and that all cut pieces except the top left corner piece should be packaged (i.e., the top left piece should be discarded). The auxiliary print job is transmitted to a guillotine cutter and the printer operator transports the hardcopy pages in Tray Y (510Y) to the guillotine cutter where they are cut and packaged according to the auxiliary print job.

Hardcopy page C (505C) and all hardcopy pages with a printed error on the bottom left corner are sent to Tray Z (510Z) of the printer. Moreover, an auxiliary print job may be generated for the hardcopy pages in Tray Z (510Z). The auxiliary print job may specify the number of hardcopy pages sent to Tray Z (510Z). The auxiliary print job may also specify the cut lines and that all cut pieces except the bottom left corner piece should be packaged (i.e., the bottom left piece should be discarded). The auxiliary print job is transmitted to a guillotine cutter and the printer operator transports the hardcopy pages in Tray Z (510Z) to the guillotine cutter where they are cut and packaged according to the auxiliary print job.

FIG. 3B is similar to FIG. 3A. However, in FIG. 3B, hardcopy page C (599) has been flipped. In other words, the printed error on hardcopy page C is now aligned with the printed error on hardcopy page B (505B). Accordingly, flipped hardcopy page C (599), like hardcopy page B (505B), can also be sent to Tray Y (510Y) and cut/processed with hardcopy page B (505B). There is no need for an additional tray (i.e., Tray Z (510Z) is not needed in FIG. 3B because of the flipping.

Figure 3C:
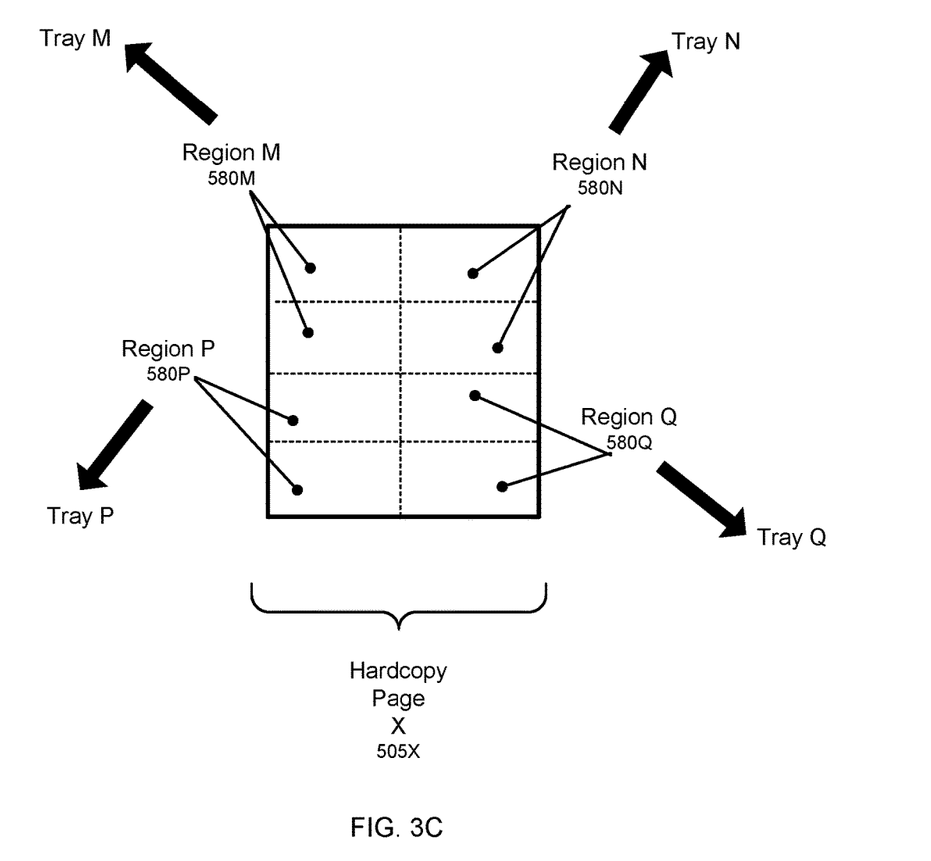

FIG. 3C shows an example in accordance with one or more embodiments of the invention. In FIG. 3C, assume there exists a main print job that specifies 8-up printing. Hardcopy page X (505X) is generated from the main print job. Hardcopy page X (505X) may be virtually partitioned into four regions: Region M (580M), Region N (580N), Region P (580P), and Region Q (580Q). Each region (580M, 580N, 580P, 580Q) corresponds to 2 of the 8 slots. If a printed error exists anywhere in Region M (580M), hardcopy page X (505X) is sent to tray M. If a printed error exists anywhere in Region N (580N), hardcopy page X (505X) is sent to tray N. Similarly, if a printed error exists anywhere in Region P (580P), hardcopy page X (505X) is sent to tray P. If a printed error exists anywhere in Region Q (580Q), hardcopy page X (505X) is sent to tray Q.

Various embodiments of the invention may have one or more of the following advantages: the ability to detect printed errors on hardcopy pages using an inline scanner; the ability to automatically sort hardcopy pages into hardcopy pages with no printed errors and hardcopy pages with printed errors; the ability to automatically sort hardcopy with printed errors based on the locations of the printed errors; the ability to flip hardcopy pages with printed errors to align the printed errors with the printed errors of other hardcopy pages and reduce the number of output locations (e.g., trays, slots, bins, etc.) needed; the ability to generate an auxiliary print job for all hardcopy pages sent to an output location; the ability to transmit the auxiliary print job to a guillotine cutter and bulk process (e.g. cut, process, discard, etc.) the hardcopy pages from a output location (e.g., trays, slots, bins, etc.); etc.

Figure 4:
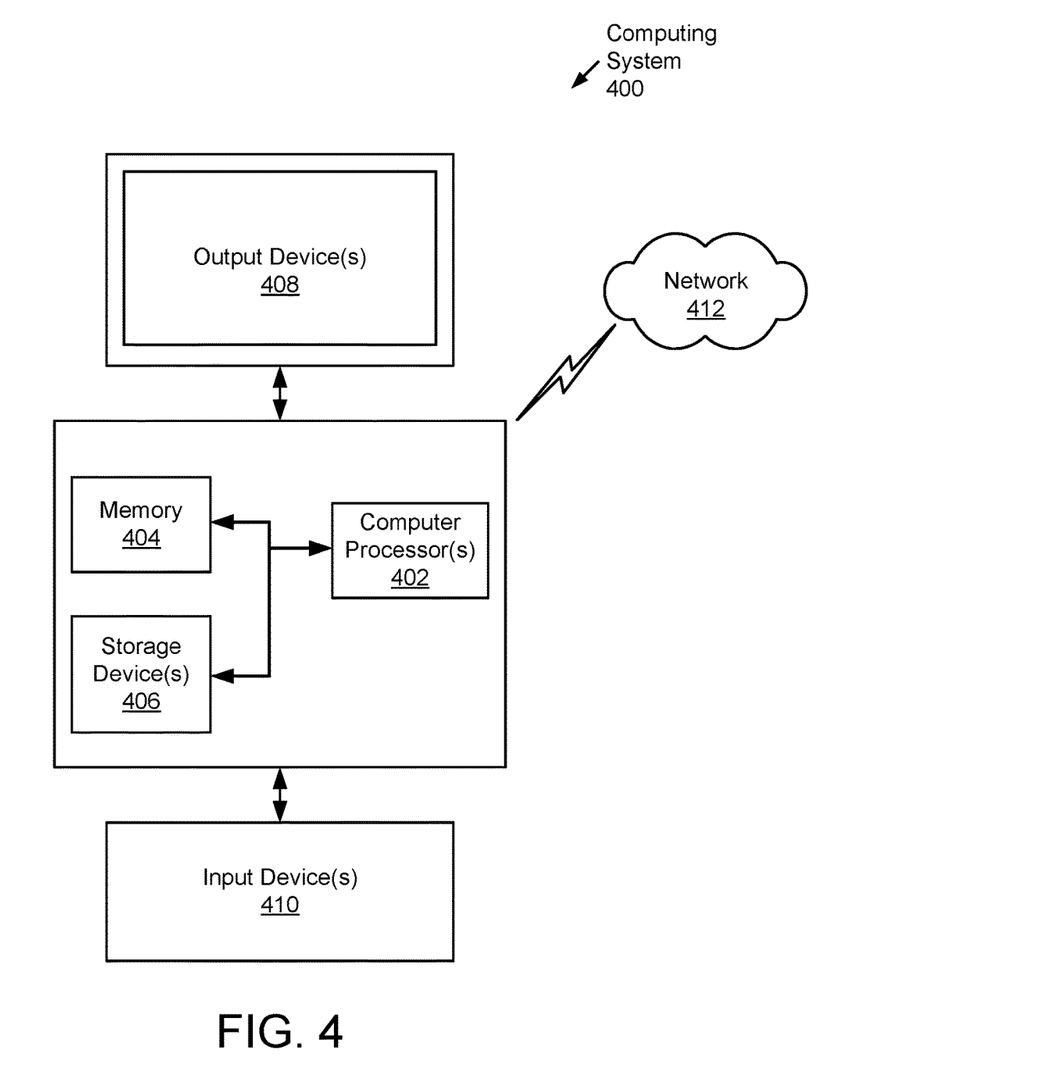
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for printing, comprising:
receiving, by a printer, a main print job;
generating, by the printer and based on the main print job, a first hardcopy page, a second hardcopy page, and a third hardcopy page;
detecting, by the printer, a printed error on a surface of the first hardcopy page;
sending, by the printer, the first hardcopy page to a first output location in response to detecting the printed error;
detecting, by the printer, no printed errors on a surface of the second hardcopy page; and
sending, by the printer, the second hardcopy page to a second output location in response to detecting no printed errors,
wherein the first output location and the second output location are for completed print jobs.

2. The method of claim 1, further comprising:
detecting, by the printer, a printed error on the third hardcopy page;
determining, by the printer, that the printed error on the third hardcopy page and the printed error on the first hardcopy page are in different positions; and
sending, by the printer, the third hardcopy page to a third output location in response to determining the different positions.

3. The method of claim 1, further comprising:
generating, based on the main print job, a first auxiliary print job specifying a cutting operation for hardcopy pages at the first output location including the first hardcopy page;
sending the first auxiliary print job to a page-by-page cutter;
generating, based on the main print job, a second auxiliary print job specifying a cutting operation for hardcopy pages at the second output location including the second hardcopy page; and
sending the second auxiliary print job to a guillotine cutter.

4. The method of claim 1, further comprising:
detecting, by the printer, a printed error on the third hardcopy page;
aligning, by the printer, the printed error on the third hardcopy page with the printed error on the first hardcopy page by flipping the third hardcopy page; and
sending, by the printer, the third hardcopy page to the first output location in response to aligning the printed error on the third hardcopy page.

5. The method of claim 4, further comprising:
generating, based on the main print job, a first auxiliary print job specifying a cutting operation for hardcopy pages at the first output location including the first hardcopy page and the third hardcopy page; and
generating, based on the main print job, a second auxiliary print job specifying a cutting operation for hardcopy pages at the second output location including the second hardcopy page,
wherein the main print job specifies N-up printing.

6. The method of claim 5, further comprising:
sending the first auxiliary print job to a guillotine cutter, wherein the guillotine cutter processes the first hardcopy page and the third hardcopy page based on the first auxiliary print job; and
sending the second auxiliary print job to the guillotine cutter, wherein the guillotine cutter processes the second hardcopy page based on the second auxiliary print job.

7. The method of claim 6, wherein the main print job is sent by a server to the printer, and wherein the server relays the first auxiliary print job and the second auxiliary print job from the printer to the guillotine cutter.

8. The method of claim 4, further comprising:
generating, by the printer and based on the main print job, a fourth hardcopy page;
detecting, by the printer, a plurality of printed errors on the front and the back of the fourth hardcopy page; and
sending, by the printer, the fourth hardcopy page to a third output location in response to detecting the plurality of errors on the front and the back of the fourth hardcopy page,
wherein the printed error on the first hardcopy page is on the front of the first hardcopy page,
wherein the printed error on the third hardcopy page is on the back of the third hardcopy page, and
wherein the main print job specifies duplex printing.

9. A printer, comprising:
a first output location;
a second output location; and
a computer processor that:
receives a main print job;
generates, based on the main print job, a first hardcopy page, a second hardcopy page, and a third hardcopy page;
detects a printed error on a surface of the first hardcopy page;
sends the first hardcopy page to the first output location in response to detecting the printed error;
detects no printed errors on a surface of the second hardcopy page; and
sends the second hardcopy page to the second output location in response to detecting no printed errors,
wherein the first output location and the second output location are for completed print jobs.

10. The printer of claim 9, wherein the processor also:
detects a printed error on the third hardcopy page;
determines that the printed error on the third hardcopy page and the printed error on the first hardcopy page are in different positions; and
sends the third hardcopy page to a third output location in response to determining the different positions.

11. The printer claim 9, wherein the processor also:
detects a printed error on the third hardcopy page;
aligns the printed error on the third hardcopy page with the printed error on the first hardcopy page by flipping the third hardcopy page; and
sends the third hardcopy page to the first output location in response to aligning the printed error on the third hardcopy page.

12. The printer of claim 11, wherein the processor also:
generates, based on the main print job, a first auxiliary print job specifying a cutting operation for hardcopy pages at the first output location including the first hardcopy page and the third hardcopy page; and generates, based on the main print job, a second auxiliary print job specifying a cutting operation for hardcopy at the second output location including the second hardcopy page, wherein the main print job specifies N-up printing.

13. The printer of claim 12, wherein the processor also:
sends the first auxiliary print job to a guillotine cutter, wherein the guillotine cutter processes the first hardcopy page and the third hardcopy page based on the first auxiliary print job; and
sends the second auxiliary print job to the guillotine cutter, wherein the guillotine cutter processes the second hardcopy page based on the second auxiliary print job.

14. The printer of claim 13, wherein the main print job is received from a server, and wherein the server relays the first auxiliary print job and the second auxiliary print job from the printer to the guillotine cutter.

15. The printer of claim 11, wherein the processor also:
generates, based on the main print job, a fourth hardcopy page;
detects a plurality of printed errors on the front and the back of the fourth hardcopy page; and
sends the fourth hardcopy page to a third output location in response to detecting the plurality of errors on the front and the back of the fourth hardcopy page,
wherein the printed error on the first hardcopy page is on the front of the first hardcopy page,
wherein the printed error on the third hardcopy page is on the back of the third hardcopy page, and
wherein the main print job specifies duplex printing.

16. A non-transitory computer readable medium (CRM) storing computer program code executed by a computer processor of a printer that:
receives a main print job;
generates, based on the main print job, a first hardcopy page, a second hardcopy page, and a third hardcopy page;
detects a printed error on a surface of the first hardcopy page;
sends the first hardcopy page to the first output location in response to detecting the printed error;
detects no printed errors on a surface of the second hardcopy page; and
sends the second hardcopy page to the second output location in response to detecting no printed errors,
wherein the first output location and the second output location are for completed print jobs.

17. The non-transitory CRM of claim 16, wherein the computer program code executed by the computer processor of the printer also:
detects a printed error on the third hardcopy page;
aligns the printed error on the third hardcopy page with the printed error on the first hardcopy page by flipping the third hardcopy page; and
sends the third hardcopy page to the first output location in response to aligning the printed error on the third hardcopy page.

18. The non-transitory CRM of claim 17, wherein the computer program code executed by the computer processor of the printer also:
generates, based on the main print job, a first auxiliary print job specifying a cutting operation for hardcopy at the first output location including the first hardcopy page and the third hardcopy page; and
generates, based on the main print job, a second auxiliary print job specifying a cutting operation for hardcopy at the second output location including the second hardcopy page,
wherein the main print job specifies N-up printing.

19. The non-transitory CRM of claim 18, wherein the computer program code executed by the computer processor of the printer also:
sends the first auxiliary print job to a guillotine cutter, wherein the guillotine cutter processes the first hardcopy page and the third hardcopy page based on the first auxiliary print job; and
sends the second auxiliary print job to the guillotine cutter, wherein the guillotine cutter processes the second hardcopy page based on the second auxiliary print job.

20. The non-transitory CRM of claim 19, wherein the main print job is received from a server, and wherein the server relays the first auxiliary print job and the second auxiliary print job from the printer to the guillotine cutter.

21. The non-transitory CRM of claim 17, wherein the computer program code executed by the computer processor of the printer also:
generates, based on the main print job, a fourth hardcopy page;
detects a plurality of printed errors on the front and the back of the fourth hardcopy page; and
sends the fourth hardcopy page to a third output location in response to detecting the plurality of errors on the front and the back of the fourth hardcopy page,
wherein the printed error on the first hardcopy page is on the front of the first hardcopy page,
wherein the printed error on the third hardcopy page is on the back of the third hardcopy page, and
wherein the main print job specifies duplex printing.

* * * * *